United States Patent [19]

Lurkens

[11] Patent Number: 5,428,257
[45] Date of Patent: Jun. 27, 1995

[54] SINGLE-PHASE RELUCTANCE MOTOR ADAPTED TO START IN A DESIRED DIRECTION OF ROTATION

[75] Inventor: Peter Lurkens, Aachen, Germany

[73] Assignee: U.S. Philips Corporation, New York, N.Y.

[21] Appl. No.: 201,588

[22] Filed: Feb. 25, 1994

[30] Foreign Application Priority Data

Mar. 4, 1993 [DE] Germany .................. 43 06 727.1

[51] Int. Cl.⁶ .............................................. H02K 17/04
[52] U.S. Cl. ........................................ 310/168; 310/193
[58] Field of Search ............... 310/105, 168, 192, 193, 310/216, 269; 318/254

[56] References Cited

U.S. PATENT DOCUMENTS

| 2,733,362 | 1/1956 | Bauer et al. | 310/162 |
| 3,448,310 | 6/1969 | Lawrenson | 310/162 |
| 3,597,676 | 8/1971 | Lawrenson | 310/163 |
| 3,956,678 | 5/1976 | Byrne et al. | 318/138 |
| 4,698,537 | 10/1987 | Byrne et al. | 310/168 |

FOREIGN PATENT DOCUMENTS

| 0253436 | 1/1988 | European Pat. Off. |
| 63-21795 | 6/1987 | Japan |
| 8606891 | 11/1986 | WIPO |

OTHER PUBLICATIONS

European Patent Office Search Report, Jun. 10, 1994, EP94200515.8.

*Primary Examiner*—Steven L. Stephan
*Assistant Examiner*—D. R. Haszko
*Attorney, Agent, or Firm*—Edward Blocker

[57] ABSTRACT

A single-phase reluctance motor is constructed so that either the rotor or the stator (or both) has poles in which there are areas of different saturation induction (thereby forming an asymmetric saturation characteristic in these poles), as a result of which an aligned position of the movable member becomes non-aligned at increasing excitation current and the movable member begins to move in a predetermined direction.

7 Claims, 3 Drawing Sheets

SINGLE-PHASE RELUCTANCE MOTOR ADAPTED TO START IN A DESIRED DIRECTION OF ROTATION

BACKGROUND OF THE INVENTION

1. Field of the Invention

The invention relates to a single-phase reluctance motor, particularly a reluctance motor comprising a stationary member (stator) and a movable member (rotor) which is movable relative to said stationary member, an air gap being formed between said members, one member comprising a magnetically permeable ferromagnetic body having salient pole parts and the other member comprising an electrically excitable ferromagnetic body having salient pole parts.

2. Description of the Related Art

Reluctance motors basically comprise a stationary member (stator) and a movable member (rotor), the stator being provided with a single-phase or polyphase electrical winding which produces a magnetic flux through the stator and the rotor when a current is passed through this winding. The rotor and the stator consist of ferromagnetic materials which are readily magnetisable up to a certain maximum induction, the saturation induction. Initially the induction in the material increases rapidly in response to an increasing current in the electrical winding and subsequently it increases only slightly. This effect is called saturation. The construction of a single-phase motor is very simple.

The magnetic forces produced under the influence of the current cause the rotor to be rotated towards a position in which the rotor and stator teeth are situated as closely as possible opposite one another, which is the so-called aligned position in which the stored magnetic energy is maximal. However, the initial direction of rotation of this single-phase motor is dependent on the initial position of the rotor and, if the motor is already in the aligned position, it will not be rotated at all. The motor will then fail to start.

In order to avoid this, such motors are provided either with an auxiliary winding or with a holding magnet, which ensure that the rotor always remains in or can be moved to (auxiliary winding) a given offset position relative to the aligned position.

SUMMARY OF THE INVENTION

It is an object of the invention to provide a single-phase reluctance motor which, without the use of an auxiliary winding or holding magnet, is capable of producing in any position a torque which enables the motor to be started from any initial position, and which also enables a desired initial direction of rotation to be defined.

According to the invention this object is achieved in that one of the permeable ferromagnetic members is constructed in such a manner that it comprises, spaced along the air-gap circumference, first areas having a low saturation inductance and second areas having a higher saturation inductance, as result of which an aligned position of the movable member becomes non-aligned at increasing excitation current under the influence of the different saturation characteristics and the movable member begins to rotate towards a new aligned position.

A thorough analysis of the operation of a reluctance motor has shown that the mechanical position of the rotor and stator teeth is not the decisive factor for the generation of the torque in a specific direction but that the motor will rotate in this direction if the magnetic energy stored in the motor increases in this direction. In principle, this is achieved by the salient teeth of the rotor and stator of a reluctance motor, which provide a substantial reluctance variation during rotation.

The stored energy assumes a maximum in the aligned position. This maximum depends on the maximal induction in the material of the rotor and stator teeth, i.e. on a material property and/or the configuration of the magnetically permeable ferromagnetic members. If the ferromagnetic member without excitation winding has first and second areas with a different saturation induction in salient pole parts, the aligned position will depend on the extent to which the respective areas are saturated under the influence of an excitation current. Owing to the change of the aligned position in response to an increasing excitation current the pans are suddenly in a non-aligned position and, owing to the tendency to move towards the new aligned position, the movable member is set into rotation. In this way auxiliary windings or holding magnets can be dispensed with.

In a further embodiment of the invention the first and the second areas are formed from magnetically permeable ferromagnetic materials with different saturation characteristics. The different saturation inductions can thus be obtained by means of the different saturation characteristics in the areas.

Another possibility of forming areas of lower saturation induction and higher saturation induction can be obtained in accordance with another embodiment of the invention in that the ferromagnetic member without excitation winding has radial slots at the location of the salient pole pans and the width of the ferromagnetic webs between the slots in the first areas of lower saturation induction is smaller than the width of the webs between the slots in the areas of higher saturation induction. Thus, upon electrical excitation the webs in the first areas of lower saturation induction are saturated more rapidly than in the second areas.

In this case the rotatable member, which in the non-saturated state assumes the aligned position for this state with a maximum of stored energy between the members, also begins to rotate because the aligned position is shifted when the excitation current increases, the motor experiencing a torque. Thus, the shift of the equilibrium of forces during saturation of the members causes the rotatable member to rotate.

In a further embodiment of the invention the webs between the slots are interconnected at the air gap. Since the slots are closed the magnetic field produced at the air gap can be substantially homogeneous. This precludes additional high-frequency torque pulsations and noise production. Again, the externally observed apparent saturation induction depends on the width of the webs between the slots. Since reluctance motors are generally constructed by means of stamped laminations the slots can be formed in the same operation during manufacture of the rotor laminations. In this way, the saturation induction in the first and second areas can be given almost any value by simple means.

If the motor tends to rotate the movable member so as to obtain a maximal overlap of the facing ferromagnetic parts, for example the teeth with a high saturation induction, the maximum attainable angle between the positions of the rotatable member in the non-saturated state and in the saturated state is an effective starting angle α. This effective starting angle α can be enlarged in that the air gap width in at least a part of the second areas is larger than in the first areas. In the non-saturated state this results in the rotatable member being moved to the side where the air gap is minimal (FIG. 4a). If the induction is gradually increased by increasing the current until the ferromagnetic areas adjoining the air gap are saturated the influence of the air gap will become insignificant relative to that of the saturation, and the rotor will rotate to the side of higher saturation induction. This enables the motor to be started in a desired direction provided that during starting the motor load does not exceed a critical limit.

The critical load during starting results from the fact that the starting pulse should be adequate to move the motor from its aligned position to at least the next overlap position of preferential ferromagnetic parts (teeth) of the motor members.

BRIEF DESCRIPTION OF THE DRAWINGS

The invention will now be described in more detail with reference to the drawing. In the drawing.

DESCRIPTION OF THE PREFERRED EMBODIMENT

Figure 1:
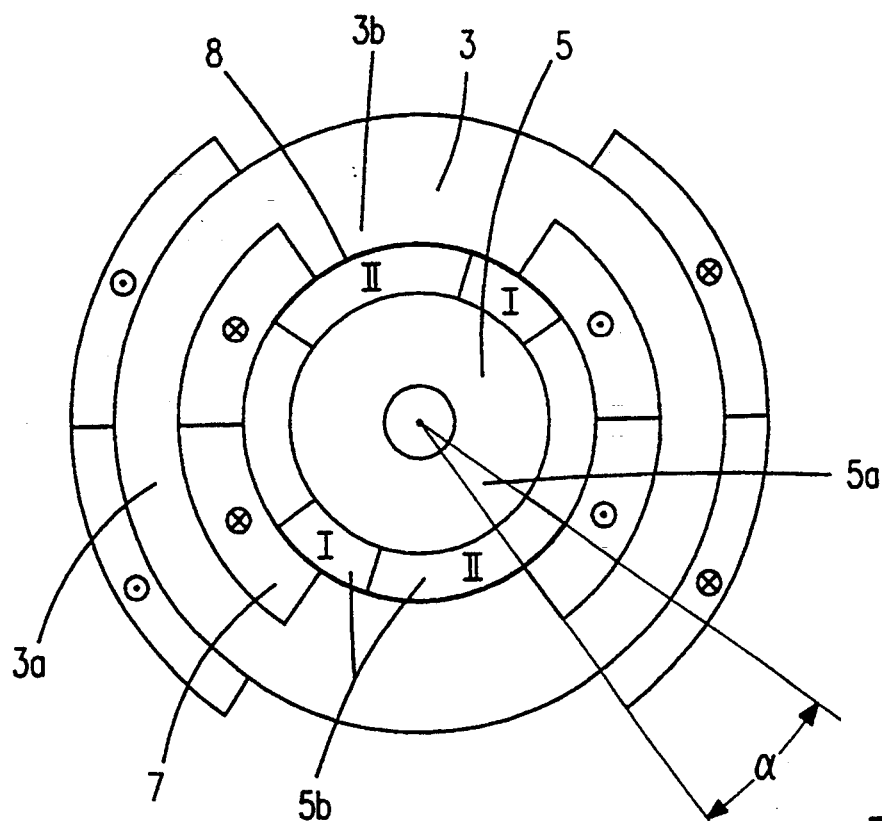
FIG. 1 shows a reluctance motor with a stationary ferromagnetic stator having two pole teeth, which can be magnetised by means of an excitation winding; the teeth of the ferromagnetic rotor have tooth areas with different saturation inductions in the circumferential direction.

FIG. 1 is a sectional view of a reluctance motor comprising a stationary member or stator 3 and a rotatable member or rotor 5. The stator can be energised by means of windings 7 to form a magnetic field at the location of the air gap. The windings 7 surround the stator pole teeth 3b.

The ferromagnetic rotor 5 comprises an iron body 5a with pole teeth 5b, each pole tooth having an area I and an area II, which areas adjoin one another in the circumferential direction. The pole tooth areas I may consist of a ferromagnetic material with a lower saturation induction. Conversely, the pole tooth areas II consist of a ferromagnetic material with a higher saturation induction.

Figure 2:
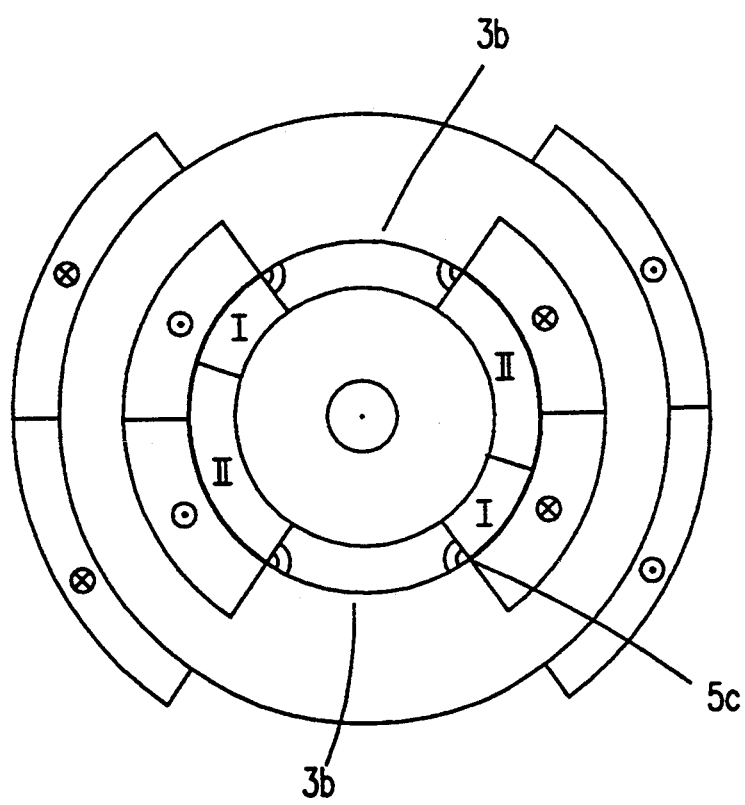
FIG. 2 shows the reluctance motor of FIG. 1 in a position in which the magnetic energy is minimal.

As is shown in FIG. 2, positions of minimum magnetic energy correspond to rotor tooth areas of different saturation induction, so that the preferential direction of the rotor again depends on the excitation current. The preferential direction is obtained by means of the stator field 5c occurring between the teeth 3b and the areas I.

Figure 3:
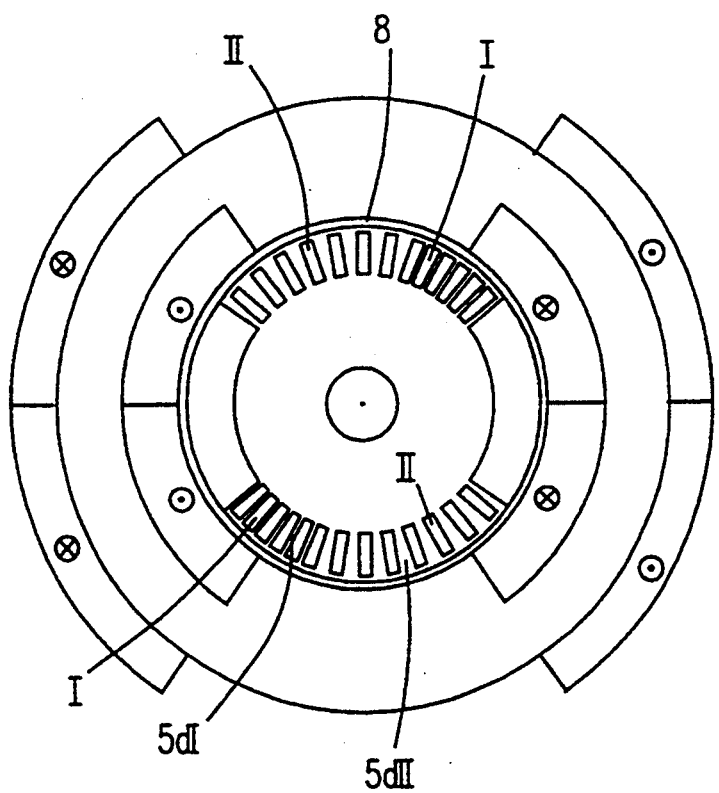
FIG. 3 shows the reluctance motor of FIG. 1, the two teeth of the rotor having first areas of lower saturation induction and second areas of higher saturation induction, the different saturation values being obtained in that radial webs in the rotor teeth in the area of lower saturation induction are narrower than in the area of higher saturation induction and the slots are closed toward the air gap.

FIG. 3 shows how the effect of different saturation inductions can also be obtained by means of a uniform ferromagnetic material. The pole teeth 5b of the rotor 5 and the core 5a of the rotor are made of the same sheet material. The teeth have radial slots which are closed at the air gap 8. The webs 5dI between the slots in the first areas I are narrower than the webs 5dII in the second areas II. In this way the laminated rotor of a uniform sheet material shown in FIG. 3 also has a lower effective saturation induction in the first area I and a higher saturation induction in the second area II. Initially the width of the webs and, consequently, the different saturation induction does not play a part in the non-saturated state, so that the rotor behaviour is magnetically symmetrical relative to the rotor tooth centre. The aligned position is therefore as shown in FIG. 1. However, if the current exceeds said limit the induction increases more slowly in the first rotor-tooth area I, which is already saturated, than in the second area II, which is not yet saturated. Consequently, the rotor tends to move to a position in which the rotor teeth of higher saturation induction have a maximal overlap. As a result, the rotor begins to rotate. The maximum angle α then reached between the rotor positions in the non-saturated state and in the strongly saturated state is then equal to half the difference between the rotor and stator tooth angles.

The effective starting angle a can be enlarged if, in addition, the air gap between the rotor and the stator is non-uniform in such a way that it counteracts the saturation effect. The air gap 5e in the areas I with narrower webs between the slots is then smaller than the air gap 5f in the areas II with wider webs. After application of a direct current in the non-saturated state, in the same way as in the situations illustrated in FIGS. 1 and 3, this will result in the rotor no longer being in such a position that the tooth centres are aligned but in the rotor being moved to a position where the air gap is minimal (FIG. 4a). Thus, a larger part of the first areas is rotated into the area where the teeth overlap. If the induction is now increased until the teeth are saturated the influence of the air gap becomes less significant than that of the saturation, and the rotor rotates to the side of higher saturation induction. The maximum attainable starting angle is then the difference between the rotor and the stator tooth angle.

Figure 4:
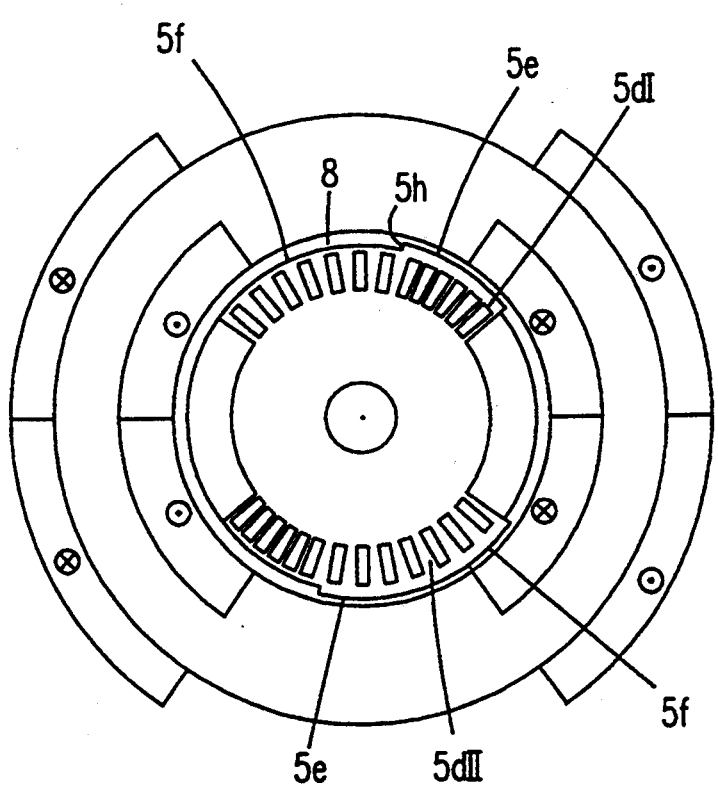
FIGS. 4 and 4a show a reluctance motor having slotted rotor teeth, the rotor tooth areas of lower saturation induction having a smaller air gap relative to the stator teeth than the rotor tooth areas of higher saturation induction.
Figure 4A:
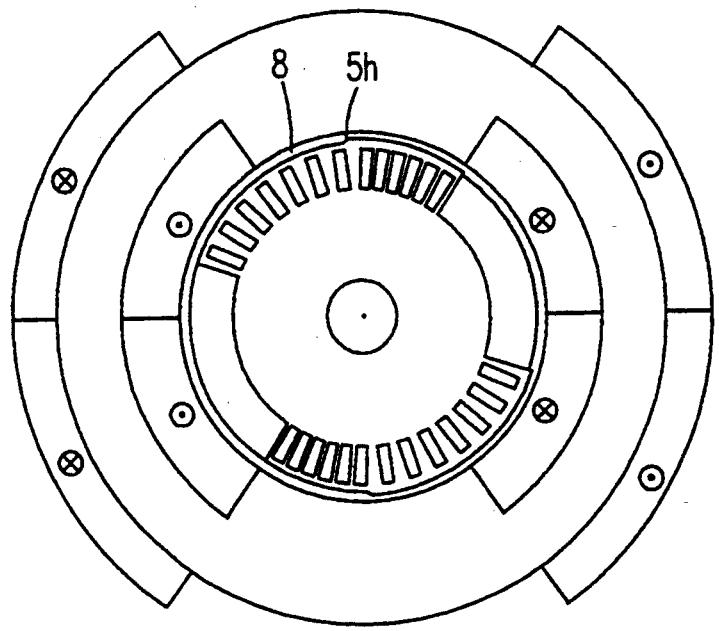

The reluctance motor shown in FIG. 4 can start in two directions but always with the proviso that the load of the motor during starting does not exceed a critical limit. The critical limit is dictated by the fact that starting is not possible if the starting pulse, which appears depending on the attainable starting angle, is not adequate to move the motor from its aligned position, in the non-saturated state, to at least the next overlap position of rotor and stator teeth.

Figure 5:
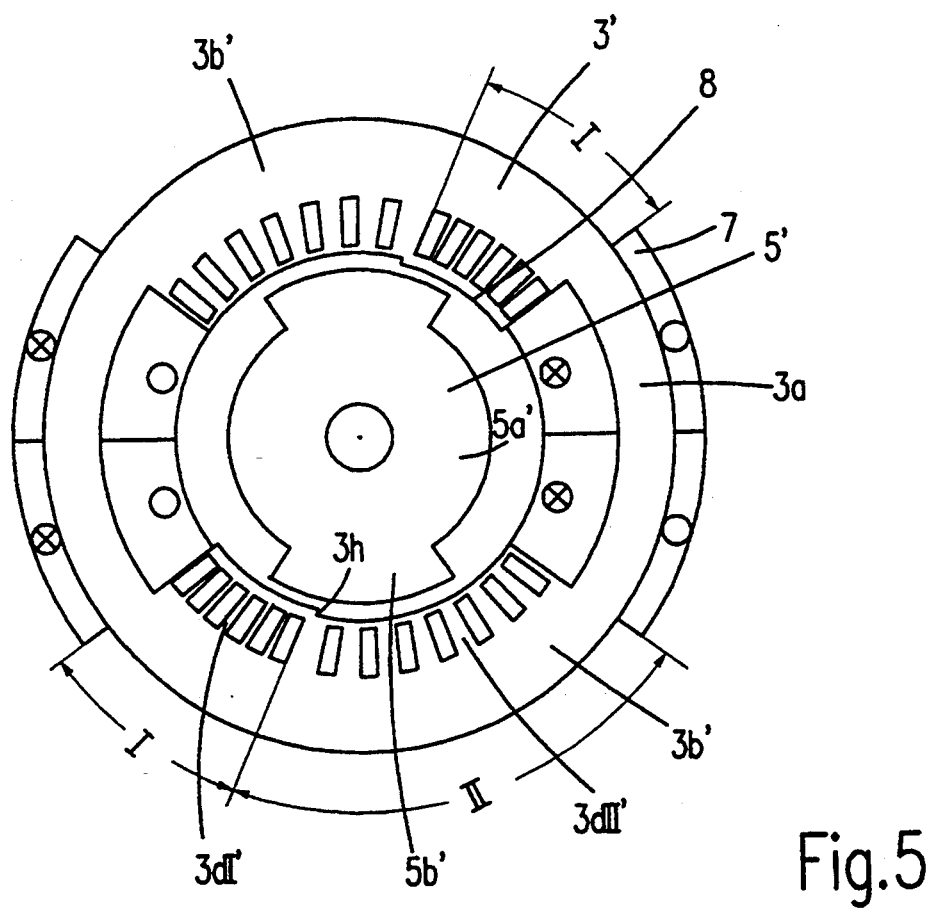
FIG. 5 shows a reluctance motor as shown in FIGS. 1 to 4a with the rotor and stator configurations interchanged.

FIG. 5 shows an alternative arrangement of the teeth with the rotor and stator configurations interchanged. The motor again comprises a stationary member or stator 3' and a rotatable member or rotor 5'. The stator can be energised by means of a winding 7 to form a magnetic field at the location of the air gap 8. The windings 7 surround the stator yokes 3a.

The pole teeth 5b' of the rotor 5' and the core 5a' of the rotor 5' are made of the same sheet material. The present example comprises two diametrally opposed pole teeth. The stator 3' has radial slots in the areas 3b' without windings 7, which slots are closed at the air gap 8. The webs 3dI between the slots in the first areas I are narrower than the webs 3dII' in the second areas II. In this way the laminated rotor of a uniform sheet material shown in FIG. 5 also has a lower effective saturation induction in the first area I and a high saturation induction in the second area II. Initially the width of the webs and, consequently, the different saturation induction does not play a part in the non-saturated state, so that the rotor behaviour is magnetically symmetrical relative to the stator tooth centre.

When the teeth in the stator and rotor are interchanged (FIGS. 1 to 4a and FIG. 5) care must be taken that all the typical elements are interchanged. This means that for a correct operation the stepped portion 5h, which in FIGS. 1 to 4a was situated at the location of the transition from the area I to the area II before the rotor webs, should be situated as a stepped portion 3h at the transition I/II before the stator webs. At the location of the narrower webs 5dI/3dI', i.e. at the location of the lower saturation induction, the air gap 8 is consequently smaller than at the location of the wider webs 5dII/3dII' with the higher saturation induction.

I claim:

1. A single-phase reluctance motor comprising a stationary member (3) (stator) and a movable member (5) (rotor) which is movable relative to said stationary member, an air gap being formed between said members, one member comprising a magnetically permeable ferromagnetic body (5a) having salient pole parts (5b) and the other member comprising an electrically excitable ferromagnetic body having salient pole parts (5a), wherein one of the permeable ferromagnetic members (5) is constructed in such a manner that it comprises, spaced along the air gap circumference, first areas (I) having a low saturation induction and second areas (II) having a higher saturation induction, as result of which an aligned position of the movable member becomes non-aligned at increasing excitation current under an influence of the different saturation characteristics and the movable member begins to rotate towards a new aligned position.

2. The reluctance motor as claimed in claim 1, wherein the first and the second areas (I, II) are formed from magnetically permeable ferromagnetic materials with different saturation characteristics.

3. The reluctance motor as claimed in claim 1, wherein the ferromagnetic member without excitation winding has radial slots (5c) in the salient pole parts (5b) forming ferromagnetic webs (5dI) between the slots in the first areas (I) having a first width and forming ferromagnetic webs (5dII) between the slots (5c) in the second areas (II) having a second width, and the first width is smaller than the second width.

4. The reluctance motor as claimed in claim 3 wherein the webs (5dI and 5dII) between the slots (5c) are interconnected at the air gap (8).

5. The reluctance motor as claimed in claim 1 wherein the air gap width in at least a part of the second areas (II) is larger than in the first areas (I).

6. The reluctance motor as claimed in claim 2, wherein said first and second areas are provided both in the movable member and in the stationary member.

7. A single-phase reluctance motor comprising a stationary member and a movable member which is movable relative to said stationary member, an air gap being formed between said members, one member comprising a magnetically permeable ferromagnetic body having salient pole parts and the other member comprising an electrically excitable ferromagnetic body having salient pole parts, wherein one of the permeable ferromagnetic members is constructed in such a manner that it comprises, spaced along the air gap circumference, first areas having a low saturation induction and second areas having a higher saturation induction to produce an asymmetrical saturation characteristic, as result of which an aligned position of the movable member becomes non-aligned at increasing excitation current and the movable member begins to move towards a new aligned position.

* * * * *